United States Patent [19]
Taylor

[11] 3,811,871

[45] May 21, 1974

[54] PROCESS FOR CLASS IV B METALS ORE REDUCTION

[76] Inventor: Paul Franklin Taylor, P.O. Box 468, Crossville, Tenn. 38555

[22] Filed: Feb. 19, 1971

[21] Appl. No.: 117,098

Related U.S. Application Data

[63] Continuation-in-part of Ser. No. 741,865, July 2, 1968, abandoned, Continuation-in-part of Ser. No. 783,730, Dec. 13, 1968, abandoned.

[52] U.S. Cl.............. 75/84, 75/101 R, 75/121, 23/19 R
[51] Int. Cl. .............. C22b 33/00, C22b 61/02
[58] Field of Search............ 75/2, 84, 101 R, 121; 23/18, 19 R, 105; 423/70, 80, 84, 85

[56] References Cited
UNITED STATES PATENTS

| | | | |
|---|---|---|---|
| 1,593,660 | 7/1926 | Lubowsky | 75/84 |
| 1,796,170 | 3/1931 | Terwilliger | 23/19 |
| 2,617,724 | 11/1952 | Espenschied | 75/121 |
| 2,697,660 | 12/1954 | Sibert | 75/121 |
| 2,939,786 | 6/1960 | Ginsberg et al | 75/84 |

*Primary Examiner*—Carl D. Quarforth
*Assistant Examiner*—B. Hunt

[57] ABSTRACT

The oxides of IV B are reduced to their metallic state by first introducing the ore into a liquid containing phosphoric acid, zinc oxide and water. The solution is mixed and calcium carbonate is added. After removal of particles held in suspension by decanting, settling, and returning the solution to the original container, the mixture is brought to a boil. Most of the volatiles are removed by boiling and sodium bicarbonate is added to the mixture, along with water. After the reaction has gone to completion, the solution is again decanted and the remaining material is leached and rinsed, following which it is smelted to the base metal.

16 Claims, No Drawings

PROCESS FOR CLASS IV B METALS ORE REDUCTION

This application is a continuation-in-part of Ser. No. 741,865, filed July 2, 1968, now abandoned; and Ser. No. 783,730, filed Dec. 13, 1968, now abandoned.

The present invention relates to a process for separating the class IV B metals from the element oxygen, more specifically termed reduction of the oxides in which the metals are chemically combined components. It is effected by the low temperature boiling environment which operates with minimum metal-oxygen chemical affinity, in contrast to that which operates at higher temperatures, and displaces chemically-bound oxygen from the ores without the usage of vacuum and/or inert environments required for higher temperature reductions. By the usage of reduction components capable of expelling gases and water vapor when boiled and heated in the presence of finely divided ores, oxygen will displace from chemical union with the ores and combine with the components, which then will partially evolve from the system upon continued heating. The instant process displaces oxygen from the ores to the solution reduction components comprised of the elements carbon, zinc, hydrogen, calcium, and phosphoric acid, and resulting gases are volatilized from the system. These gases are combinations of carbon dioxide, carbon monoxide, water vapor, zinc oxide, hydrocarbon gases, etc. Phosphoric acid will dehydrate through four definite acid forms when in such a boiling environment by releasing oxygen and hydrogen in the form of water vapor which evolves out of the system. The hot progressively dehydrating acid will constantly dispel oxygen from the ores with the chemical aid of the other components to replace that which is constantly escaping the system as gases, and continue thus until oxygen is removed from combination with the ores. The final phosphoric acid form after such dehydration is a polymerized glassy substance. This material, with calcium oxide, remains attached to the metallic particles as highly passivated phosphides, exhibiting chemically stable qualities, and requiring refinement operations for their removal from the metal. Reduction components with regards to the metals are those which are high on the Electrochemical Activity Chart, in conjunction with hydrogen and carbon. The very basic nature of the process requires a study of the entire technical disclosure with special emphasis directed to the lengthy and varied process steps, however, the process may be more exactly defined by a continuation of the abstract as follows: Process is accomplished by the mixing together within a suitable container the Class IV B ores and a liquid formula solution comprised of the reduction components Phosphoric acid, zinc oxide, an alkylphenol polyglycol ether type sulfated surfactant, and distilled water to make; followed by additions of pulverized limestone, after which mixture is stirred while reaction goes to completion, decanting liquid into a second container and allowing to settle out, decanting liquid back into first container, heating mixture and boiling while stirring until mixture is dehydrated and/or deoxidized, terminating boiling while mixture is yet pliable or continuing until baked hard; leaching pliable with alkali compounds and water, followed by water rinsings and acid leaching treatments, further water rinsings, drying and refining the residue; pulverizing hard baked residue and leaching with alkali compounds, followed by water rinsings and acid leaching treatments, further water rinsings, drying and refining residue.

As starting materials for this process, powdered or pulverized class IV B Metal ore is mixed with a certain liquid chemical solution. Powdered or pulverized calcium carbonate ($CaCO_3$) is added as a catalyst. The ore is of the following types: rutile, and/or titanium ore of ilmenite (both being chemically $TiO_2$); zirconium ore of zirconia silicate, and Baddeleyite (both being chemically $ZrO_2$), Hafnium ore as included in and a part of the zirconium ore (and is chemically $HfO_2$). The liquid chemical solution is of the following composition (by weight ratio).

| | |
|---|---|
| Phosphoric Acid | 24.20 lb. more or less |
| Zinc Oxide | 0.50 lb. more or less |
| Sulfated Surfactant | 1.00 lb. more or less |
| Water to make | 115.00 lb. more or less |

The sulfated surfactant is a type of wetting agent and of composition alkylphenol polyglycol ether. The water should be of a distilled quality. The powdered calcium carbonate ($CaCO_3$) should be at least 99 percent pure.

When the selected ore and other starting materials are mixed together within a common container and heated with endothermic heat, gases (including oxygen) are volatilized from the solution, thereby creating deficiencies of that element oxygen within certain of the solution components, which causes deoxidized and/or dehydrated effects of those components, and by such action the evolution of the element oxygen from the ores.

It is, therefore, an object of the present invention to provide another method for the reduction of class IV B metals.

It is a further object of the present invention to provide a method of producing class IV B metals in a more simple and economical manner.

Other objects and advantages of the present invention will become apparent from a further reading of the description and the appended claims.

With the above and other objects in view, the present invention mainly comprises a process for separating the class IV B metals from chemically combined oxygen; featuring ease of reduction operations, and one that is economically advantageous.

The process begins with the stated mixing together of the starting materials in a suitable pot or vat, followed by agitating until the visible chemical reaction is completed. The effect is a cleansing of the ore and bringing oxide impurities into solution.

Cleansed ore will settle out to the bottom of the container. Solution with impurities may then be decanted into a suitable second container. When impurities are precipitated and/or settled to the bottom of that vessel the solution is then decanted back into the original por or vat.

The pot or vat is then placed within a suitable furnace arrangement where effective heat may be applied to it.

The solution with the ore and catalyst is then boiled with heat until sufficient liquid and other elements have volatilized and escaped from the pot or vat as flue gases. The boiling is attended and enhanced by frequent stirrings with a suitable agitator. It is also attended by such mechanical arrangement as necessary for collecting and venting of the flue gases.

The temperature operation range throughout the boiling period is that which is necessary for maintaining a rolling boil. Heating may be terminated while residue is yet pliable, or continued until residue is baked hard, as the operator may choose.

If the choice is for a pliable residue, heat being terminated, sufficient time for cooling is allowed and then sodium compounds are added to the metal residue followed by additions of water. Chemicals and dross will react with the sodium water, go into solution and then may be decanted off.

With sufficient water rinsing of the residue, metallic-like powder will result,.

Powder may then be subjected to further cleansing with certain cleansing and leaching agents as selected by the operator, conventional, and for the removal of other contaminants. These agents may be acids, detergents, hydrocarbon solutions, alkali, and alkali compounds, etc.

After sufficient cleansing and leaching, powder is then dried in such manner so that its ignition with components of the atmosphere will not result or be hazardous.

The resulting powder may be then smelted and/or refined by conventional means to produce class IV B metal, or brought into a more commercially pure grade powder state by further cleansing and leaching agents as the operator may choose.

If the choice is for a hard baked residue, heat being terminated, sufficient time for cooling is allowed and then residue is removed from pot or vat.

Residue may then be transported through a grinding and sifting operation, followed by cleansing and leaching agents as selected by the operator, conventional, and for the removal of all contaminants. These agents may be acids, detergents, hydrocarbon solutions, alkali, and alkali compounds etc. A metallic-like powder will result.

After such cleansing and leaching, powder may then be dried in such manner so that its ignition with components of the atmosphere will not result or be hazardous.

The resulting powder may then be smelted and/or refined by conventional means to produce class IV B metal, or brought into a more commercially pure grade powder state by further cleansing and leaching agents, as the operator may choose.

OPERATIONAL EXAMPLE 1 — FOR TITANIUM METAL ORE REDUCTION

The operation for titanium metal ore reduction as derived from the foregoing specification may be exemplified more particularly by an explanation for the reduction of a 17 pound batch of titanium ore ($TiO_2$), which the inventor has operated successfully.

The reduction equipment consists of the following: a removable stainless steel pot fabricated from heavy gage material and reinforced so as to prevent warping when subjected to heat, approximately 15 inches deep and 30 inches in diameter; a circular, double-walled, steel furnace wherein the pot rests, having internal insulation, being approximately 3 feet in height, and enclosing a large, circular, double, gas-type burner which is positioned underneath the bottom of the pot a suitable arrangement for collecting and venting of flue gases from both pot and furnace. The furnace may be made of common steel but the pot of stainless steel to prevent metallic contamination of the titanium ore being reduced. Even so stainless steel elements may be found as traces of impurities in analytical examinations of class IV B metals reduced in such a pot. The ideal pot should be fabricated of titanium metal or one impervious to such chemical erosion to prevent this sort of metallic contamination.

Introduced within the pot are 45 pounds (5 U.S. gallons) liquid chemical solution known as Taylor Formula, such solution being of ingredients as described in the above specification. In addition to its wetting qualities this formula also has the property of forming passivated coatings on metallic surfaces, thereby preventing oxidation, and may, as is applied in this process, accomplish reduction of the metallic ores, provided the solution is deoxidized and/or dehydrated; which it is here caused to be by boiling and the consequent volatilizing of the elements oxygen and water.

To the solution is added 17 pounds (1 U.S. gallon) of titanium ore ($TiO_2$), ground to -325 mesh.

Good stirring of the mixture at this time permits saturation by the solution of all the ore particles within the batch.

The ratio by weight is 45 pounds of solution to 17 pounds of ore for this batch (or by volume 5 gallons solution to 1 gallon ore).

To this mixture is added ½ pound (1 cup) limestone of approximately -100 mesh. This type is at least 99 percent pure calcium carbonate ($CaCO_3$).

The mixture is again stirred vigorously to aid limestone in entering the solution completely, with the chemical reaction result being the release of carbon dioxide ($CO_2$) gas;. The resulting lime ($CaO$) enters the solution as a catalyst agent supporting reduction of the metallic oxides when the solution begins to be deoxidized and dehydrated by volatilizing (boiling).

When mixing and reaction has terminated the brownish-red titanium ore particles settle out to the bottom of the container readily, while the muddy and brownish colored impurities tend to settle more slowly. Before the latter settles, it with the solution decanted from the pot into another container. These are undesirable oxides, dross, and other impurities.

Necessary time for settling out in the second container is allowed before the solution is decanted back into the original pot containing the cleansed titanium ore. The may be impurities disposed of or reclaimed for titanium.

Reason for re-using the original solution is because to add new solution would be equivalent to changing the starting materials ratios, since the ore is purged and cleansed, and any additional solution would be detrimental for proper operation of the process, as well as unneeded and useless.

With the pot resting within the furnace, heat is applied from the burner below until boiling is attained.

Stirring is necessary at this time to prevent a caking effect, and the solution and ore becomes a more homogeneous mixture as the particles begin to swirl within the solution as it boils.

The burners are lowered at this time to maintain a good rolling boil and the flue gas collector hood-cover is positioned over the pot. Throughout the entire boiling operation the hood-cover is kept closed as much as possible (notwithstanding stirring) to allow least amounts of fume discomfort to the operator.

The boiling continues for approximately 1 hour with three or four stirrings at intervals during this period.

The burners are shut off at the time it is observed a the material has reached syrupy viscosity and while it is yet pliable. Or, — at this point the operator may elect to bake residue hard.

If the election is for a pliable and syrupy residue, approximately 15 minutes of cooling time is allowed. Then the hood-cover is raised and 2 pounds of bicarbonate of soda ($NaHCO_3$) is sprinkled on top of the residue followed by approximately 5 gallons of water.

A reaction is most visible. When the reaction is completed the solution is decanted from the pot followed by sufficient rinsings of residue with water until it is colorless with no visible signs of dross, or other impurities. Residue may then be reacted with acids or other cleansing and leaching agents followed by water rinsings until sufficient impurities are out of the residue powder.

The titanium powder is then carefully and thoroughly dried in the pot by refiring the burners, at which time the reduction process is terminated and the burners shut off.

If the election of the operator is for a hard-baked residue, burners are left on longer near the conclusion of the boiling. Burners are then both shut off. Approximately 15 minutes of cooling time is allowed, and the hood-cover is raised and the pot removed from the furnace. The residue is then removed from the pot and transported through a crushing and grinding operation, reduced by attrition to approximately -100 to -200 mesh grade. After proper screening, powder residue may then be subjected to cleansing and leaching solutions as selected by the operator, conventional, and for the removal of contaminants. These may be acids, or other cleansing and leaching agents, followed by water rinsings until sufficient impurities are out of the residue powder.

After such pulverizing, cleansing, leaching and rinsings, the titanium powder is then carefully and thoroughly dried, using precautions as stated above, at which time the reduction process is terminated.

Some passivation may be retained with the metallic powder produced in the above example, but emerges as upon smelting and/or refining of the titanium by titanium smelting techniques — which are not included as part of this present invention. Or the powder may be brought into a more commercially pure grade state by further cleansing and leaching agents as the operator may choose.

OPERATIONAL EXAMPLE 2 — FOR TITANIUM METAL ORE REDUCTION

Another operation for titanium metal ore reduction as derived from the foregoing specification may be further exemplified more particularly by an explanation for the reduction of a 100 pound batch of titanium ore ($TiO_2$), which the inventor has operated successfully.

The reduction equipment consists of the same as that used for Operational Example 1.

Introduced within the pot are 135 pounds (15 U.S. gallons) liquid chemical solution of the same type as that used in Operational Example 1.

To the solution is added 100 pounds (6 U.S. gallons) of titanium ore ($TiO_2$), ground to -325 mesh.

Good stirring of the mixture at this time permits saturation by the solution of all the articles within the batch.

The ratio by weight is 135 pounds of solution to 100 pounds of ore for this batch (or by volume 15 gallons solution to 6 gallons ore).

To this mixture is added 3 pounds (6 cups) limestone of approximately -100 mesh. This type is at least 99 percent pure calcium carbonate ($CaCO_3$).

From this point all procedures and operations continue precisely as that in Operational Example 1 except, boiling of the mixture continues for approximately 2½ hours.

The burners are shut off at the time it is observed the material has reached a syrupy viscosity and while it is yet pliable. Or, — at this point the operator may elect to bake residue hard. If so, the burners will be left on longer near the conclusion of the boiling, then shut off.

If the election is for a pliable and syrupy residue, approximately 20 minutes of cooling time is allowed. Then the hood-cover is raised and 6 pounds of bicarbonate of soda ($NaHCO_3$) is sprinkled on top of the residue followed by approximately fifteen gallons of water.

Reaction, rinsing, further cleansing with acids or other cleansing and leaching agents, and final water rinsings are as outlined in Operational Example 1.

The drying of the powder is also as stated in that example.

If the election of the operator is for a hard-baked residue, approximately 20 minutes of cooling time is allowed, and then residue is treated precisely as outlined in Operational Example 1.

Titanium metallic powder may then be smelted and/or refined, or cleansed with leaching other solutions for removal of, impurities, and other foreign as stated in operational example 1 matter.

Other batches of varying ore weights or volumes have been effectively reduced with the equipment, procedures, and ingredients as those used in Operational Examples 1 and 2, but with different boiling periods, different cooling periods, and different ingredient ratios. Operational Example 1 exemplifies a minimum batch while Operational Example 2 exemplifies a maximum batch. Thus, batch ratios smaller or greater, or in between these examples may be indicated intersecting by coordinates along a line drawn on a certain chart whose horizontal coordinates represent amounts of ore used in pounds while the vertical coordinates represent the amounts of liquid formula used, also in pounds. Inventor has reduced batches from a few grams to over 100 pounds, and by these efforts has determined that such a chart is, indeed, reliable and useful for making determinations for the ratios of ore to liquid for all possible batches. Chart is as shown below and designated as FIG. 1 and titled Ore to Formula Batch Ratios.

The calcium carbonate ($CaCO_3$) ratio for the various possible batches is determined by the usage of ½ pound limestone of approximately -100 mesh, per 17 pounds (or 1 U.S. gallon) of titanium metal ore sized -80 through -400 mesh.

The sodium bicarbonate ($NaHCO_3$) ratio for flushing after the boiling period is determined for all various possible batches by the usage of 2 pounds per 45 pounds (or 5 U.S. gallons) of liquid formula used in the reduction.

Flushing water and other cleansing and leaching agents may have ratios for all various and possible batches in the same proportion as those used in Operational Examples 1 and 2 above.

Boiling and cooling periods for all various and possible batches may only be determined by the operator depending upon his particular geographical location of operation. Parameters for those determinations may be indicated by the above examples; the operations being performed at a geographical location of 2,000 feet elevation with atmospheric temperatures normally ranging between 40° F and 80° F. In consideration of such factors as atmospheric temperatures, atmospheric pressures and altitudes, atmospheric humidity fuels and oxidizers used, and vertical and lateral dimensions of reduction equipment used, clear-cut and definite statements cannot be made as to these procedures for various stated batch sizes.

To the solution is added 25 pounds (1 U.S. gallon) of zirconium-hafnium ore ($ZrO_2$-$HfO_2$), ground to -400 mesh.

Good stirring of the mixture at this time permits saturation by the solution of all the ore particles within the batch.

The ratio by weight is 45 pounds of solution to 25 pounds of ore for this batch. (Or by volume, 5 gallons solution to 1 gallon ore.)

To this mixture is added ½ pound (1 cup) limestone of approximately -100 mesh. This type is at least 99 percent pure calcium carbonate ($CaCO_3$).

The mixture is again stirred vigorously to aid limestone in entering the solution completely, with the chemical reaction result being the release of carbon dioxide ($CO_2$) gas. The resulting lime ($CaO$) enters the solution as a catalyst agent supporting reduction of the metallic oxides when the solution begins to be deoxidized and dehydrated by volatilizing (boiling).

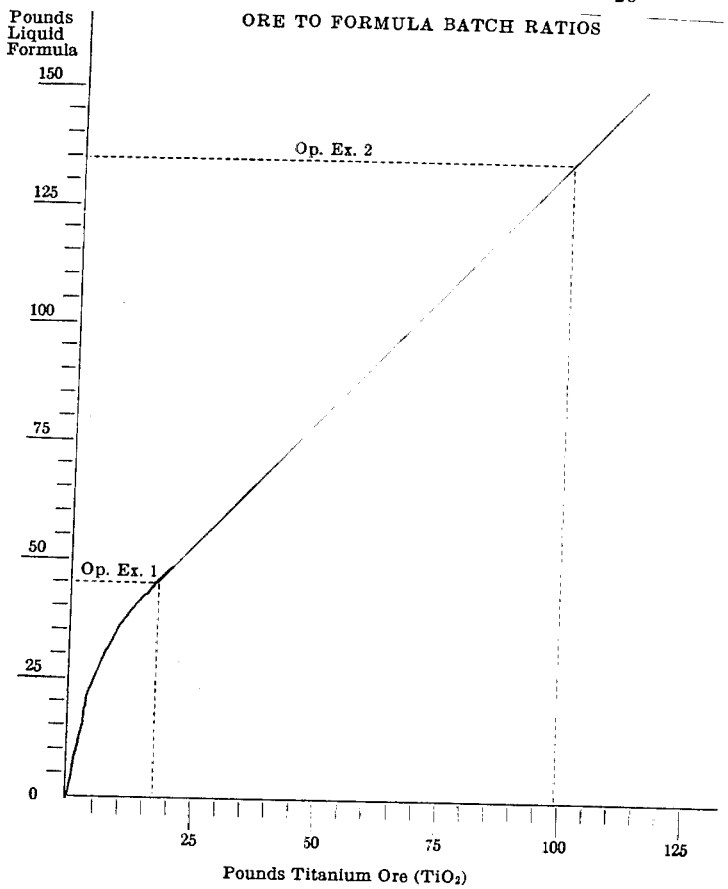

FIG. 1

OPERATIONAL EXAMPLE 3 — FOR ZIRCONIUM AND HAFNIUM METAL ORE REDUCTION

The operation for zirconium and hafnium metal ore reduction as derived from the foregoing specification may be exemplified more particularly by an explanation for the reduction of a 25 pound batch of zirconium ore ($ZrO_2$), which includes small amounts of hafnium ore ($HfO_2$), which the inventor has operated successfully.

The reduction equipment consists of the same as that used for Operational Examples 1 and 2.

Introduced within the pot are 45 pounds (5 U.S. gallons) liquid chemical solution of the same type as that used in Operational Examples 1 and 2.

When mixing is completed, the reaction terminated, and the pot placed within the furnace, heat is applied from the burner below until boiling is attained.

Stirring is necessary at this time to prevent caking effects, and the solution and ore becomes a more homogenous mixture as the particles begin to swirl within the solution as it boils.

The gas burners are lowered at this time to maintain a good rolling boil and the flue gas collector hood-cover positioned over the pot. Throughout the entire boiling operation the hood-cover is kept closed as much as possible (notwithstanding stirring) to allow least amounts of fume discomfort to the operator.

The boiling continues for approximately 1 hour with three or four stirrings at intervals during this period.

The burners are shut off at the time it is observed the material has reached a syrupy viscosity and while it is yet pliable, or, at this point the operator may elect to bake residue hard.

If the election is for a pliable and syrupy residue, approximately 15 minutes of cooling time is allowed. Then the hood-cover is raised and 2 pounds of bicarbonate of soda ($NaHCO_3$) is sprinkled on top of the residue followed by approximately 5 gallons of water.

A reaction is most visible. When the reaction is completed the solution is decanted from the pot followed by sufficient rinsings of residue with water until it is colorless with no visible signs of dross, or other impurities. Residue may then be reacted with acids or other cleansing and leaching agents followed by rinsings until sufficient impurities are out of the residue powder.

The zirconium-hafnium powder is then carefully and thoroughly dried by using heating and drying methods which are most apt to negate the possibility of ignition in the presence of oxygen and other gases. The zirconium-hafnium powder may then be smelted and/or refined by techniques which are not included as part of this present invention. Or the powder may be brought into a more commercially pure grade state by further cleansing and leaching agents as the operator may choose.

If the election of the operator is for a hard-baked residue, burners are left on longer near the conclusion of the boiling. Burners are then both shut off. Approximately 15 minutes of cooling time is allowed, and the hood-cover is raised and the pot removed from the furnace. The residue is then removed from the pot and transported through a crushing and grinding operation, reduced by attrition to approximately -100 to -200 mesh grade. After proper screening, powder residue may then be subjected to cleansing and leaching solutions as selected by the operator, conventional, and for the removal of contaminants. These may be acids, or other cleansing and leaching agents, followed by water rinsings until sufficient impurities are out of the residue powder.

The zirconium-hafnium powder is then carefully and thoroughly dried by using heating and drying methods which are most apt to negate the possibility of ignition in the presence of oxygen and other gases.

Some passivation may be retained with the metallic powder as produced in the above example, but emerges upon smelting and/or refining of the zirconium-hafnium by techniques — which are not included as part of this present invention. Or the powder may be brought into a more commercially pure grade state by further cleansing and leaching agents as the operator may choose.

OPERATIONAL EXAMPLE 4 — FOR ZIRCONIUM AND HAFNIUM ORE REDUCTION

Another operation for zirconium and hafnium metal ore reduction as derived from the foregoing specification may be further exemplified more particularly by an explanation for the reduction of a 150 pound batch of zirconium ore ($ZrO_2$), which includes small amounts of hafnium ore ($HfO_2$), which the inventor has operated successfully.

The reduction equipment consists of the same that for Operational Examples 1, 2, and 3.

Introduced within the pot are 135 pounds (15 U.S. gallons) liquid chemical solution of the same type as that used in Operational Examples 1, 2, and 3.

To the solution is added 150 pounds (6 U.S. gallons) of zirconium-hafnium ore ($ZrO_2$-$HfO_2$) ground to -400 mesh.

Good stirring of the mixture at this time permits saturation by the solution of all the ore particles within the batch.

The ratio by weight is 135 pounds of solution to 150 pounds of ore for this batch (or by volume 15 gallons solution to 6 gallons ore).

To this mixture is added 3 pounds (6 cups) limestone of approximately -100 mesh. This type is at least 99 percent pure calcium carbonate ($CaCO_3$).

From this point all procedures and operations continue precisely as that in Operational Example 3 except, boiling of the mixture continues for approximately 2½ hours.

The burners are shut off at the time it is observed the material has reached a syrupy viscosity and while it is yet pliable. Or, — at this point the operator may elect to bake residue hard. If so, the burners will be turned to high position for about 30 minutes, then shut off.

If the election is for a pliable and syrupy residue, approximately 20 minutes of cooling time is allowed. Then the hood-cover is raised and 6 pounds of bicarbonate of soda ($NaHCO_3$) is sprinkled on top of the residue followed by approximately 15 gallons of water.

Reaction, rinsing, further cleansing with acids or other cleansing and leaching agents and final water rinsings are as outlined in Operational Example 3.

The drying of the powder is also as stated in that example.

If the election of the operator is for a hard-baked residue, approximately 20 minutes of cooling time is allowed, and then residue is treated precisely as outlined in Operational Example 3.

Zirconium-hafnium metallic powder may then be smelted and/or refined or cleansed with other leaching solutions for the removal of, impurities, and other foreign matter as stated in Operational Example 3.

Other batches of varying ore weights or volumes have been effectively reduced with the equipment, procedures, and ingredients as those used in Operational Examples 3 and 4, but with different boiling periods, different high heat periods, different cooling periods, and different ingredient ratios. Operational Example 3 exemplifies a minimum batch while Operational Example 4 exemplifies a maximum batch. Thus, batch ratios smaller or greater, or in between these examples may be indicated by intersecting coordinates along a line drawn (B) on a certain chart whose horizontal coordinates represent amounts of ore used in pounds while the vertical coordinates represent the amounts of liquid formula used, also in pounds. Inventor has reduced batches from a few grams to over 150 pounds, and by these efforts has determined that such a chart is, indeed, reliable and useful for making determinations for the ratios of ore to liquid for all possible batches. Chart is as shown below and designated as FIG. 2 and titled Zirconium-Hafnium Ore to Formula Batch Ratios.

The calcium carbonate ($CaCO_3$) ratio for the various possible batches is determined by the usage of ½ pound limestone of approximately -100 mesh, per 25 pounds (or 1 U.S. gallon) of zirconium-hafnium metal ore sized -80 through -400 mesh.

The sodium bicarbonate ($NaHCO_3$) ratio for flushing after the boiling period is determined for all various possible batches by the usage of 2 pounds per 45 pounds (or 5 U.S. gallons) of liquid formula used for the reduction.

Flushing water and other cleansing and leaching agents may have ratios for all various and possible batches in the same proportion as those used in Operational Examples 3 and 4 above.

Boiling and cooling periods for all various and possible batch sizes may only be determined by the operator depending upon his particular geographical location of operation. Parameters for those determinations may be indicated by the above examples; the operations being performed at a geographical location of 2000 feet elevation with atmospheric temperatures normally ranging between 40°F. and 80 F. In consideration of such factors as temperatures, atmospheric pressures and altitudes, atmospheric humidity, fuels and oxidizers used, and vertical and lateral dimensions of reduction equipment used, clear-cut and definite statements cannot be made as to these procedures for various stated batch sizes.

ZIRCONIUM-HAFNIUM ORE TO FORMULA BATCH RATIOS

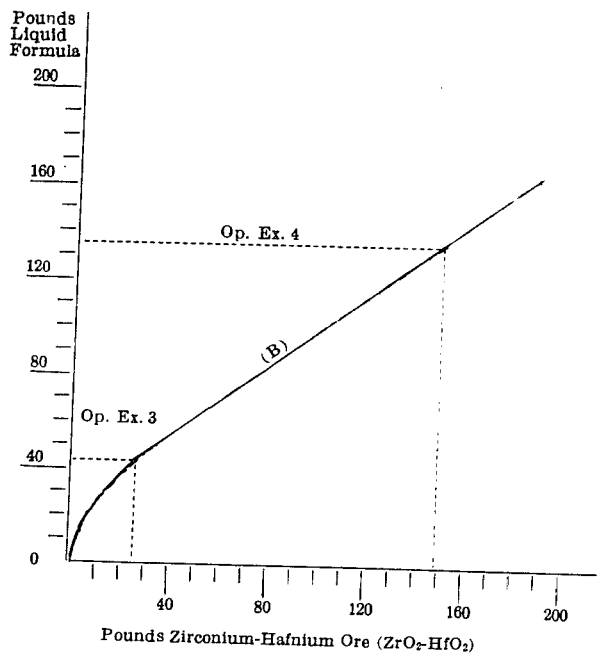

FIG. 2

CLASS IV B METALS ORE REDUCTION CHEMISTRY

The following discussion relates to chemical reactions which transpire throughout the reduction process from the time the process commences to final drying of the powder.

No single or particular (definite) component making up the Taylor Formula, or the calcium carbonate, is the 'sole' reduction agent. Rather, all react in concert within the solution medium, exhibiting joint, definite, and objective reaction — the extracting of the element oxygen from the Class IV B metal ores when heated together.

Within the solution long chains of carbon atoms from the surfactant are arranged so that polar forces hold other compounds of the solution in suspension, they being phosphoric acid ($P_2O_5$), zinc oxide ($ZnO_2$), and lime (CaO). This arrangement presents very strong 'wetting' and passivating properties.

The calcium carbonate ($CaCO_3$) loses carbon dioxide ($CO_2$) upon entering the solution and the resulting lime (CaO) attaches itself to the phosphoric acid molecule becoming a form of $Ca(H_2PO_4)$. This returns to calcium oxide (CaO) within a progressively deoxidized and dehydrated medium, while in the meantime presenting the properties of a true catalyst by intensifying the extraction of the element oxygen from the ores, and ending with some final passivation on the metallic particles, while the phosphoric molecule becomes the final form of a dehydrated metaphosphoric substance also acting to further passivate the particles.

The zinc oxide also acts in this regard upon losing oxygen by boiling, along with the calcium oxide. However, the bulk of it (ZnO) escapes as flue gases near the end of the boiling.

The phosphoric acid would perhaps react with the ores upon boiling were it not prevented from doing so by the action of the passivating elements. A reaction otherwise would be comparable to titanium sulphate formations as when titanium ore is boiled in sulphuric acid.

Also noted and of interest within this discussion is that phosphoric acid is deoxidized and dehydrated with removal of water (boiling) from the beginning or thophosphoric acid ($H_3PO_4$)(which is $P_2O_5 \cdot 3H_2O$) through four definite acids. The second is pyrophosphoric acid ($H_4P_2O_7$), (and is $P_2O_5 \cdot 2H_2O$); the third being triphosphoric acid ($H_5P_3O_{10}$),(and is $3P_2O_5 \cdot 5H_2O$); the fourth and last being metaphosphoric acid ($HPO_3$),(and is $P_2O_5 \cdot H_2O$).

The last, being the most deoxidized and dehydrated of all, takes on a polymerization property as above stated, of covalent bond formation between the vacant P orbital of the phosphorus atoms of one molecule and a pair of electrons on an oxygen atom of another (as discussed by Ehret in Smith's College Chemistry 7th edition). This substance is glassy and forms a solid.

Thus it is obvious that, with the boiling off of the liquid solution the four definite compounds (ZnO, CaO, $P_2O_5$, and CH...) becomes more deoxidized and dehydrated — which joint effect acts to extract the oxygen from the ores.

The final metaphosphoric acid tends to remain in the polymerized and glassy state within the residue. But with the addition of sodium compounds, depolymerization (hydration) results and the soluble form of sodium metaphosphate results. This is a salt and of the form $NaPO_3$, and is capable of absorbing water and thereby becoming primary, secondary, and tertiary sodium orthophosphate ($NaH_2PO_4$), ($Na_2HPO_4$), and ($Na_3PO_4$), at residue flushing.

The element carbon needs be discussed also as regards its relationship within the solution, and specifically how it contributes to the reduction of the ore. First, as stated previously, the carbon forms long chains within the solution, being a component of the sulfated surfactant material. With the boiling and the consequent expelling of water vapor, the carbon becomes progressively more deficient of those elements within its chemical union. Carbon compounds become more deoxidized and dehydrated as oxygen and water vapor are expelled. As this progresses the carbon exhibits greater affinity for those two elements (oxygen and hydrogen) to satisfy chemical equilibrium. The carbon in chemical union with the oxygen escapes the solution first as carbon dioxide gas ($CO_2$) with emissions becoming carbon monoxide (CO) as further deoxidation and dehydration of the solution transpires.

Due to these emissions the carbon becomes a stronger force near the end of the heating period and tends to aid in the deoxidation of the ores in unison with the already stated lime (CaO), zinc oxide ($ZnO_2$), and phosphoric acid ($P_2O_5$).

Finally as above stated, the residue is caused to react with the sodium water for the removal of phosphide formations, and flushed away from the powder residue.

The present application for letters patent is derived from two original filings dated July 2, 1968 (bearing Ser. No. 741,865, titled TITANIUM METAL ORE REDUCTION), and Dec. 13, 1968 (bearing Ser. No. 783,730, titled ZIRCONIUM METAL ORE REDUCTION); claims antecedent and content derivation from those original filings; includes also effectivity for hafnium metal; negates the original filings as redundant with respect to present and instant application effectivity for Class IV B metals of the periodic classification of elements; is a continuation-in-part of those filings, and claims their filing dates due to in-force statutory periods for their responsive filings, such periods set to terminate Mar. 8, 1971 for original filing Ser. No. 741,865, and Feb. 23, 1971 for original filing Ser. No. 783,730.

What is claimed as new and desired to be secured by Letters Patent is:

1. A method of reducing titanium dioxide to titanium comprising the steps of:
   A. Adding powdered titanium dioxide to a solution consisting essentially of about 24.2 parts by weight of phosphoric acid, about 0.5 parts by weight of zinc oxide, about 1 part by weight of a sulfated surfactant, and about 115 parts by weight of water,
   B. Dissolving ½ pound of calcium carbonate to every 17 pounds of titanium dioxide,
   C. Pouring the solution off after the reaction has gone to completion and allowing the sediment to settle out,
   D. Decanting the solution back into the container holding the treated titanium dioxide,
   E. Bringing the solution to a boil while agitating to obtain a homogenous solution,
   F. Vaporizing the volatile materials until residue is syrupy (pliable),
   G. Adding 2 pounds of sodium bicarbonate to every 45 pounds of liquid formula used,
   H. Adding water,
   I. Decanting the resulting solution after the reaction has gone to completion,
   J. Leaching and rinsing the material in acids and water,
   K. Drying the resultant residue, and
   L. Smelting the remaining material to produce titanium metal.

2. The process of claim number 1 wherein the titanium dioxide is in the form of rutile and/or the titanium product of Ilmenite ore.

3. The process of claim number 1 wherein various ratios of batches comprised of titanium dioxide and solution are indicated approximately by intersecting coordinates on a certain line on a chart designated FIG. 1 and titled ORE TO FORMULA BATCH RATIO.

4. The process of claim number 1 wherein sulfated surfactant is an alkylphenol polyglycol ether.

5. A method of reducing titanium dioxide to titanium comprising the steps of:
   A. Adding powdered titanium dioxide to a solution consisting essentially of about 24.2 parts by weight of phosphoric acid, about 0.5 parts by weight of zinc oxide, about 1 part by weight of a sulfated surfactant, and about 115 parts by weight of water,
   B. Dissolving ½ pound of calcium carbonate to every 17 pounds of titanium dioxide,
   C. Pouring the solution off after the reaction has gone to completion and allowing the sediment to settle out,
   D. Decanting the solution back into the container holding the treated titanium dioxide,
   E. Bringing the solution to a boil while agitating to obtain a homogenous solution,
   F. Vaporizing the volatile materials until residue is hard,
   G. Removing residue and pulverizing,
   H. Leaching and reacting residue with acids and solvents, and rinsing with water,
   I. Drying the resultant residue,
   J. Smelting the remaining material to produce titanium metal.

6. The process of claim number 5 wherein the titanium dioxide is in the form of rutile and/or the titanium product of Ilmenite ore.

7. The process of claim number 5 wherein various ratios of batches comprised of titanium dioxide and solution are indicated approximately by intersecting coordinates on a certain line on a chart designated FIG. 1 and titled ORE TO FORMULA BATCH RATIO.

8. The process of claim number 5 wherein sulfated surfactant is an alkylphenol polyglycol ether.

9. A method of reducing zirconium dioxide to zirconium and hafnium comprising the steps of:
   A. Adding powdered zirconium dioxide to a solution consisting essentially of about 24.2 parts by weight of phosphoric acid, about 0.5 parts by weight of zinc oxide, about 1 part by weight of a sulfated surfactant, and about 115 parts by weight of water,
   B. Dissolving ½ pound of calcium carbonate to every 25 pounds of zirconium dioxide,
   C. Bringing the solution to a boil while agitating to obtain a homogenous solution,
   D. Vaporizing the volatile materials until residue is syrupy (pliable),
   E. Adding 2 pounds of sodium bicarbonate to every 45 pounds of liquid formula used.
   F. Adding water
   G. Decanting the resulting solution after the reaction has gone to completion,
   H. Leaching and rinsing the material in acids and water,
   I. Drying the resultant residue, and,
   J. Smelting the remaining material to produce zirconium and hafnium metal.

10. The process of claim number 9 wherein the zirconium dioxide is in the form of Baddeleyite and/or the zirconium product of zirconium silicate.

11. The process of claim number 9 wherein various ratios of batches comprised of zirconium dioxide and solution are approximately indicated by intersecting coordinates on a certain line (B) on a chart which is designated FIG. 2 and titled ZIRCONIUM-HAFNIUM ORE TO FORMULA BATCH RATIOS.

12. The process of claim number 9 wherein sulfated surfactant is an alkylphenol polyglycol ether.

13. A method of reducing zirconium dioxide to zirconium and hafnium comprising the steps of:
   A. Adding powdered zirconium dioxide to a solution consisting essentially of about 24.2 parts by weight of phosphoric acid, about 0.5 parts by weight of zinc oxide, about 1 part by weight of a sulfated surfactant, and about 115 parts by weight of water, B. Dissolving ½ pound of calcium carbonate to every 25 pounds of zirconium dioxide, C. Bringing the solution to a boil while agitating to obtain a homogenous solution, D. Vaporizing the volatile materials until residue is hard, E. Removing residue and pulverizing, F. Leaching and reacting residue with acids and solvents, and rinsing with water, G. Drying the zirconium and hafnium powders, H. Smelting the remaining material to produce zirconium and hafnium metal.

14. The process of claim number 6 wherein the zirconium dioxide is in the form of Baddeleyite and/or the zirconium product of zirconium silicate.

15. The process of claim number 13 wherein various ratios of batches comprised of zirconium dioxide and solutions are approximately indicated by intersecting coordinates on a certain line (B) on a chart which is designated FIG. 2 and titled ZIRCONIUM-HAFNIUM ORE TO FORMULA BATCH RATIOS.

16. The process of claim number 13 wherein sulfated surfactant is an alkylphenol polyglycol ether.

* * * * *